US012650998B2

(12) United States Patent
Provine

(10) Patent No.: US 12,650,998 B2
(45) Date of Patent: Jun. 9, 2026

(54) TRIGGERING KNOWLEDGE PANELS

(71) Applicant: Google LLC, Mountain View, CA (US)

(72) Inventor: John R. Provine, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 234 days.

(21) Appl. No.: 17/249,059

(22) Filed: Feb. 18, 2021

(65) Prior Publication Data

US 2021/0173833 A1 Jun. 10, 2021

Related U.S. Application Data

(63) Continuation of application No. 17/248,838, filed on Feb. 10, 2021, now Pat. No. 12,130,827, which is a continuation of application No. 13/830,526, filed on Mar. 14, 2013, now Pat. No. 10,922,326.

(60) Provisional application No. 61/730,115, filed on Nov. 27, 2012.

(51) Int. Cl.
 *G06F 16/24* (2019.01)
 *G06F 16/248* (2019.01)
 *G06F 16/9535* (2019.01)

(52) U.S. Cl.
 CPC ........ *G06F 16/248* (2019.01); *G06F 16/9535* (2019.01)

(58) Field of Classification Search
 CPC ... G06F 16/248; G06F 16/9535; G06F 16/338
 See application file for complete search history.

(56) References Cited

U.S. PATENT DOCUMENTS

| | | | |
|---|---|---|---|
| 8,032,519 B2 | 10/2011 | Groeneveld et al. | |
| 8,156,135 B2 * | 4/2012 | Chi ........................ | G06F 16/951 |
| | | | 707/765 |
| 8,285,699 B2 | 10/2012 | Groeneveld et al. | |
| 9,268,820 B2 * | 2/2016 | Henry ................... | G06F 16/345 |
| 2005/0096897 A1 | 5/2005 | Ando et al. | |
| 2007/0078822 A1 * | 4/2007 | Cucerzan .............. | G06F 16/951 |
| 2007/0106659 A1 * | 5/2007 | Lu ........................ | G06F 16/3326 |
| | | | 707/999.005 |
| 2007/0214122 A1 | 9/2007 | Bala | |
| 2008/0027888 A1 | 1/2008 | Azzam et al. | |
| 2008/0133505 A1 * | 6/2008 | Bayley ................... | G06F 16/34 |
| | | | 707/999.005 |

(Continued)

*Primary Examiner* — Brittany N Allen
(74) *Attorney, Agent, or Firm* — Brake Hughes Bellermann LLP

(57) ABSTRACT

Methods, systems, and apparatus, including computer programs encoded on a computer storage medium, for providing knowledge panels with search results. In one aspect, a method includes receiving a query. Search results that are responsive to the query are obtained. A first set of factual entities referenced by the query are identified. A particular factual entity is selected from the first set. It is determined that a knowledge panel for the particular factual entity is to be provided with the search results based, at least in part, on content of the knowledge panel and characteristics of the search results. The knowledge panel can include at least one content item, for the selected factual entity, received from a first resource and at least one content item, for the selected factual entity, received from a second resource different than the first resource. The knowledge panel is provided.

14 Claims, 11 Drawing Sheets

(56)          References Cited

U.S. PATENT DOCUMENTS

| | | |
|---|---|---|
| 2009/0241018 A1 | 9/2009 | Costello et al. |
| 2009/0282022 A1 | 11/2009 | Bennett |
| 2009/0327268 A1 | 12/2009 | Denney et al. |
| 2010/0076972 A1 | 3/2010 | Baron et al. |
| 2010/0198837 A1* | 8/2010 | Wu .................. G06F 16/24575 |
| | | 707/E17.014 |
| 2011/0208822 A1 | 8/2011 | Rathod et al. |
| 2011/0307483 A1* | 12/2011 | Radlinski ........... G06F 16/2455 |
| | | 707/E17.084 |
| 2012/0059838 A1 | 3/2012 | Berntson et al. |
| 2012/0078918 A1* | 3/2012 | Somasundaran ..... G06F 40/295 |
| | | 707/748 |
| 2013/0159272 A1 | 6/2013 | Donmez et al. |
| 2013/0332438 A1* | 12/2013 | Li ..................... G06F 16/24575 |
| | | 707/706 |
| 2014/0059042 A1 | 2/2014 | Vinay et al. |
| 2014/0101119 A1* | 4/2014 | Li ...................... G06F 16/3331 |
| | | 707/706 |

* cited by examiner

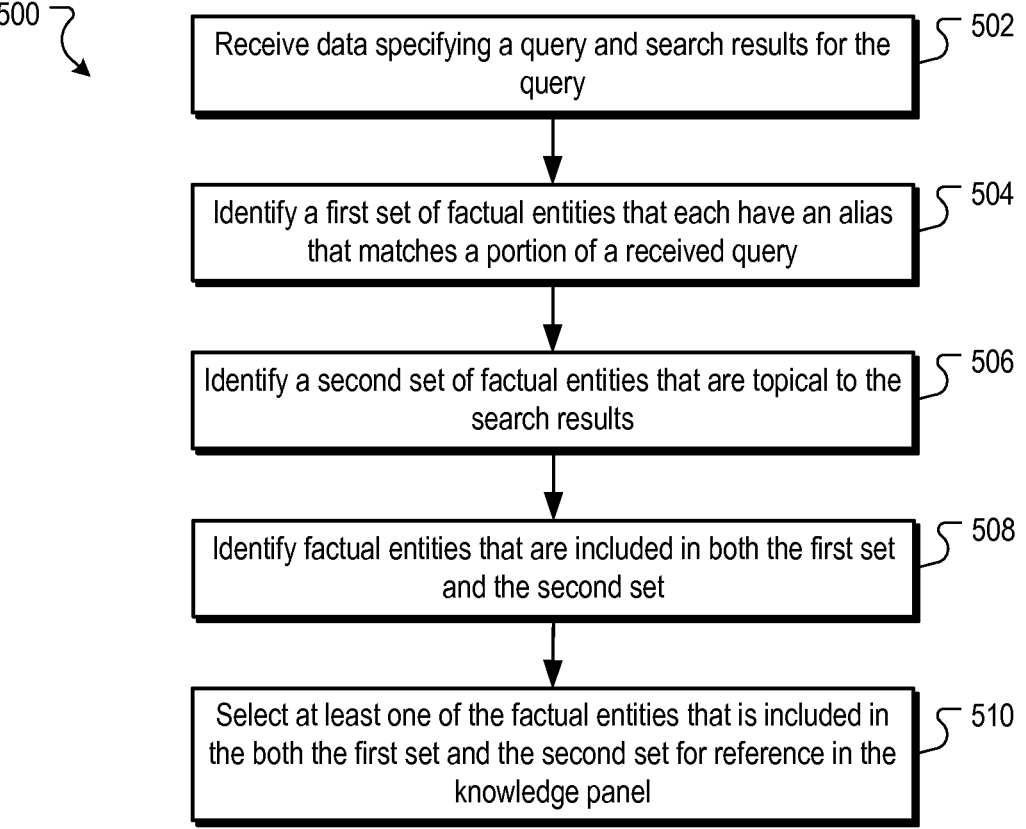

500

Receive data specifying a query and search results for the query ⟍ 502

Identify a first set of factual entities that each have an alias that matches a portion of a received query ⟍ 504

Identify a second set of factual entities that are topical to the search results ⟍ 506

Identify factual entities that are included in both the first set and the second set ⟍ 508

Select at least one of the factual entities that is included in the both the first set and the second set for reference in the knowledge panel ⟍ 510

FIG. 5

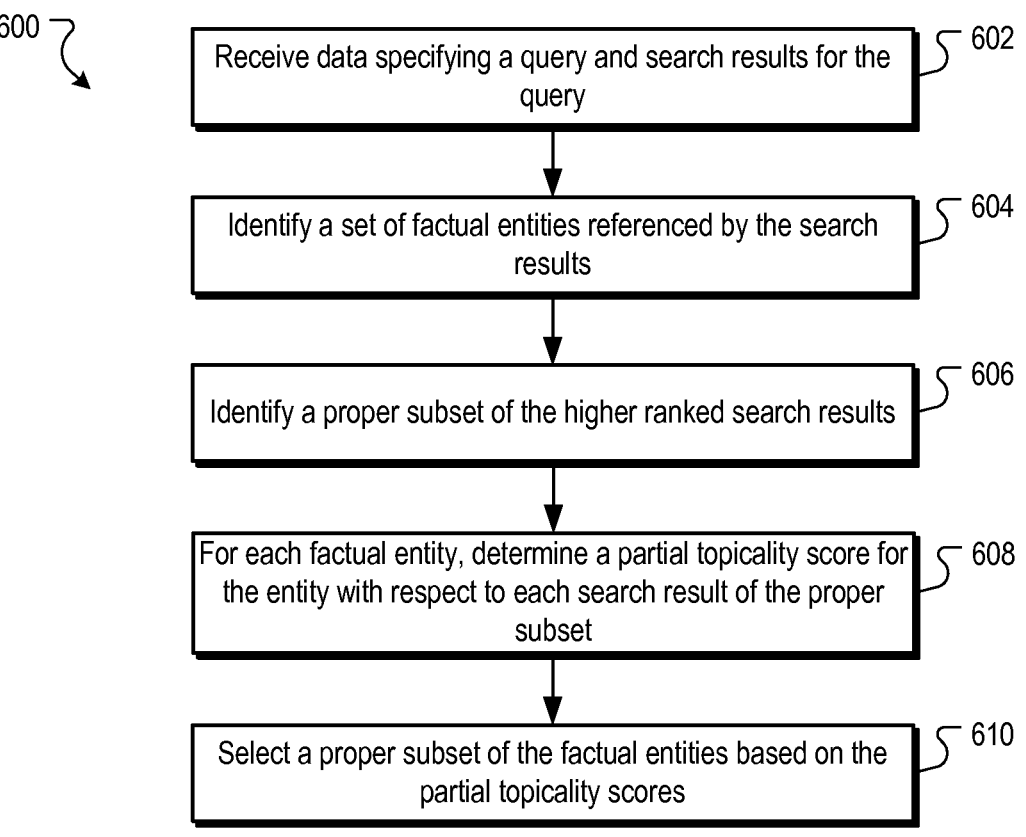

600

602
Receive data specifying a query and search results for the query

604
Identify a set of factual entities referenced by the search results

606
Identify a proper subset of the higher ranked search results

608
For each factual entity, determine a partial topicality score for the entity with respect to each search result of the proper subset 610
Select a proper subset of the factual entities based on the partial topicality scores

FIG. 6

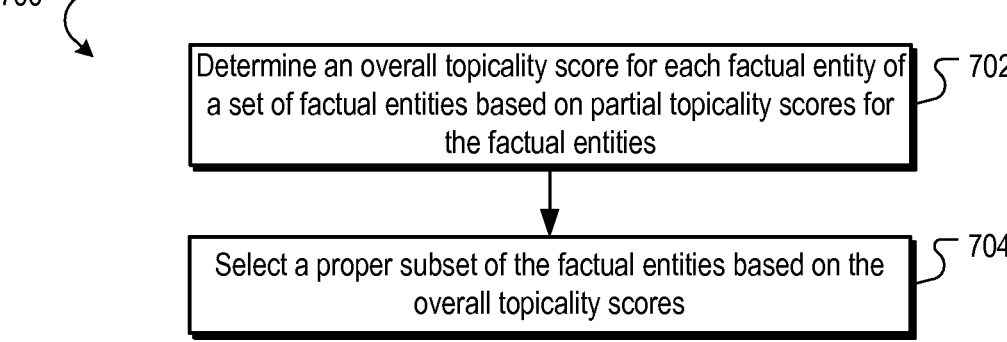

700

702
Determine an overall topicality score for each factual entity of a set of factual entities based on partial topicality scores for the factual entities 704
Select a proper subset of the factual entities based on the overall topicality scores

FIG. 7

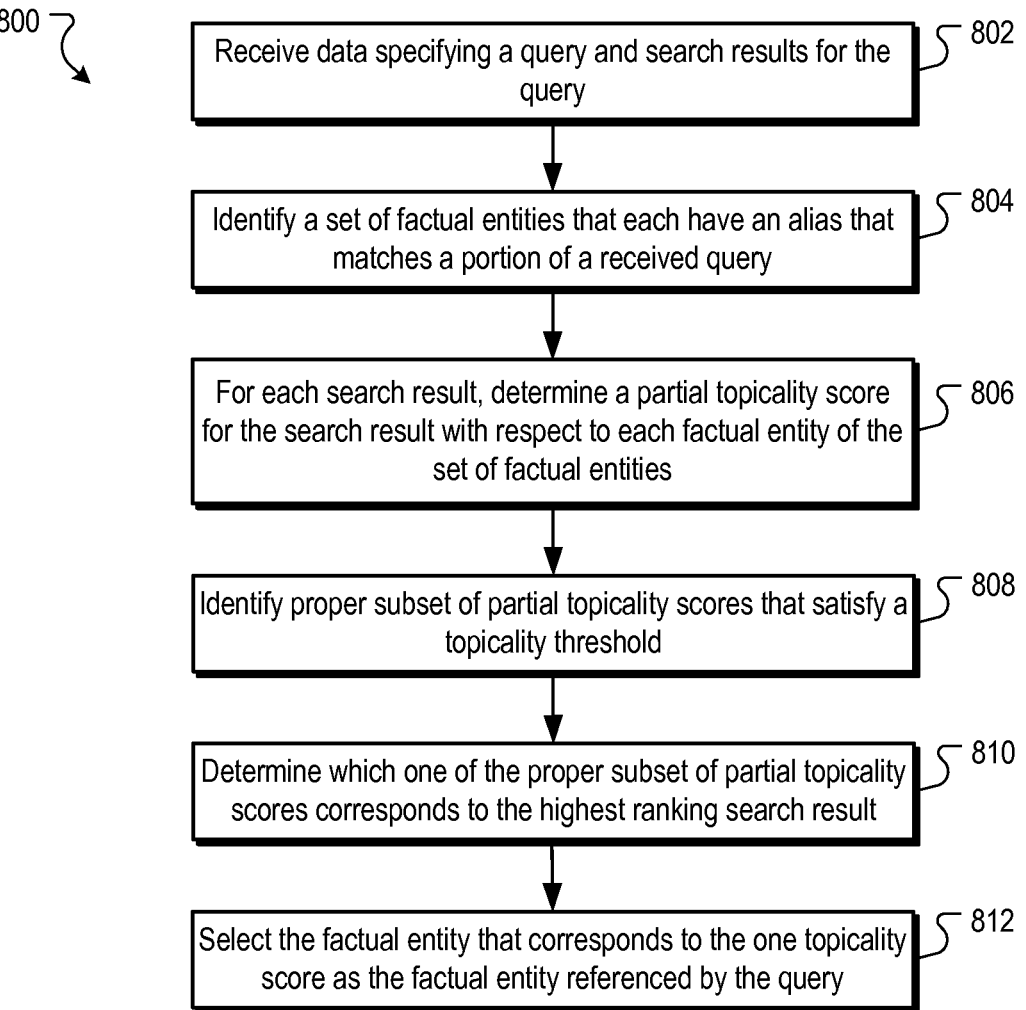

800

Receive data specifying a query and search results for the query ⌐ 802

Identify a set of factual entities that each have an alias that matches a portion of a received query ⌐ 804

For each search result, determine a partial topicality score for the search result with respect to each factual entity of the set of factual entities ⌐ 806

Identify proper subset of partial topicality scores that satisfy a topicality threshold ⌐ 808

Determine which one of the proper subset of partial topicality scores corresponds to the highest ranking search result ⌐ 810

Select the factual entity that corresponds to the one topicality score as the factual entity referenced by the query ⌐ 812

Receive data specifying a query and search results for the query — 902

Identify click through rates ("CTRs") for each search results with respect to the received query — 904

906

Yes ← Determine whether to provide knowledge panel based on CTRs → No

908 — Provide knowledge panel

910 — Do not provide knowledge panel

TRIGGERING KNOWLEDGE PANELS

CROSS-REFERENCE TO RELATED APPLICATIONS

This application is a continuation of, and claims priority to, U.S. patent application Ser. No. 17/248,838, filed on Feb. 10, 2021, entitled "TRIGGERING KNOWLEDGE PANELS," which is a continuation of, and claims priority to, U.S. patent application Ser. No. 13/830,526, filed on Mar. 14, 2013, entitled "TRIGGERING KNOWLEDGE PANELS," which claims the benefit under 35 U.S.C. § 119(e) of U.S. Patent Application No. 61/730,115, filed on Nov. 27, 2012, entitled "TRIGGERING KNOWLEDGE PANELS," all of which are incorporated herein by reference in their entirety.

BACKGROUND

This specification relates to presenting data with search results and determining when to present the data with the search results.

The Internet provides access to a wide variety of resources, such as image files, audio files, video files, and web pages. A search system can identify resources in response to queries submitted by users and provide information about the resources in a manner that is useful to the users. The users can then navigate through, e.g., click on, the search results to acquire information of interest to the users.

Users of search systems are often searching for information regarding a specific entity. For example, users may want to learn about a singer that they just heard on the radio. Conventionally, the user would submit a search query identifying the singer and select from a list of search results determined to be relevant to the search query.

SUMMARY

In general, one innovative aspect of the subject matter described in this specification can be embodied in methods that include the actions of receiving a query; obtaining search results that are responsive to the received query; identifying a first set of factual entities referenced by the received query; selecting, from among the first set of factual entities, a particular factual entity for which a knowledge panel is eligible to be provided with the search results, the selection being based, at least in part, on a measure of topicality between each identified factual entity in the first set and one or more of the obtained search results; determining that the knowledge panel for the particular factual entity is to be provided with the search results, the determination being based, at least in part, on content of the knowledge panel and characteristics of the search results, the knowledge panel including at least one content item, for the selected factual entity, received from a first resource and at least one content item, for the selected factual entity, received from a second resource different than the first resource; and providing the knowledge panel. Other embodiments of this aspect include corresponding systems, apparatus, and computer programs, configured to perform the actions of the methods, encoded on computer storage devices.

These and other embodiments can each optionally include one or more of the following features. Selecting, from among the first set of factual entities, a particular factual entity for which a knowledge panel is eligible to be provided with the search results can include identifying a second set of factual entities, each factual entity of the second set being a factual entity determined to be topical to the obtained search results; identifying one or more factual entities included in the set of factual entities and in the second set of factual entities; and selecting one of the one or more factual entities as the identified factual entity.

Identifying a second set of factual entities, each factual entity of the second set being a factual entity determined to be topical to the obtained search results, can include identifying a third set of factual entities, each factual entity of the third set being a factual entity referenced in at least one of the obtained search results; identifying a proper subset of the obtained search results, the proper subset including a particular number of higher ranked obtained search results; for each factual entity of the third set of factual entities, determining, relative to the factual entity, a partial topicality score for each search result in the proper subset of obtained search results, the partial topicality score for each search result being a measure of topical relatedness between the search result and the factual entity; and selecting, from the third set of factual entities, the second set of factual entities based on the partial topicality scores.

Selecting the second set of factual entities based on the partial topicality scores can include, for each factual entity of the third set, determining an overall topicality score for the factual entity based on the partial topicality scores for the factual entity; and selecting the second set of factual entities based on the overall topicality scores. Determining the overall topicality score for the factual entity based on the partial topicality scores for the factual entity can include determining a weighted sum of the partial topicality scores for the factual entity.

Selecting, from among the first set of factual entities, a particular factual entity for which a knowledge panel is eligible to be provided with the search results can include for each obtained search result, determining a topicality score for the search result with respect to each factual entity of the first set of factual entities, the topicality score for a search result with respect to a factual entity being a measure of topical relatedness of the search result with respect to the factual entity; comparing each topicality score to a topicality threshold to identify a proper subset of the topicality scores that exceed satisfy the topicality threshold; determining which one of the proper subset of topicality scores corresponds to a highest ranking search result for the proper subset of topicality scores; and selecting the factual entity that corresponds to the one partial topicality score as the particular factual entity.

Determining that the knowledge panel for the particular factual entity is to be provided with the search results can include identifying a click-through rate for each obtained search result with respect to the received query; determining that the identified click-through rates do not satisfy a threshold click-through rate; and determining to provide the knowledge panel in response to determining that the identified click-through rates do not satisfy the threshold click-through rate.

Determining that the knowledge panel for the particular factual entity is to be provided with the search results can include identifying a top ranked search result for the received query; identifying a click-through rate for the top ranked search result with respect to the received query; determining that the identified click-through rate does not exceed satisfy a click-through rate threshold; and determining to provide the knowledge panel in response to determining that the identified click-through rate does not exceed satisfy the click-through rate threshold.

Determining that the knowledge panel for the particular factual entity is to be provided with the search results can include identifying content for inclusion in the knowledge panel; determining that the identified content includes at least a threshold amount of content; and determining to provide the knowledge panel in response to determining that the identified content includes at least a threshold amount of content.

Determining that the knowledge panel for the particular factual entity is to be provided with the search results can include determining whether the knowledge panel includes links to query refinements for the received query; and determining to provide the knowledge panel in response to determining that the knowledge panel includes links to query refinements for the received query.

Particular embodiments of the subject matter described in this specification can be implemented so as to realize one or more of the following advantages. Knowledge panels can improve users' search experiences, in particular for queries directed to learning, browsing, or discovery. For example, the knowledge panel supplies users with basic factual information from multiple different sources or a summary of information about a particular entity referenced in a search query. Knowledge panels can assist users in navigating to multiple different network locations that each includes related content in a seamless and natural way. Knowledge panels can supply new content that may not otherwise be encountered by a user without the user selecting several different search results and visiting multiple different network locations. Knowledge panels can also help users obtain information faster than they would if the users were required to click through multiple search results to obtain the information from multiple different network locations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a flow chart of an example process for identifying a factual entity for providing a knowledge panel.

FIG. 6 is a flow chart of an example process for identifying a subset of factual entities for a received search query.

FIG. 7 is a flow chart of an example process for selecting a subset of factual entities based on topicality scores.

FIG. 8 is a flow chart of an example process for identifying a factual entity for providing a knowledge panel.

4

Figure 10:
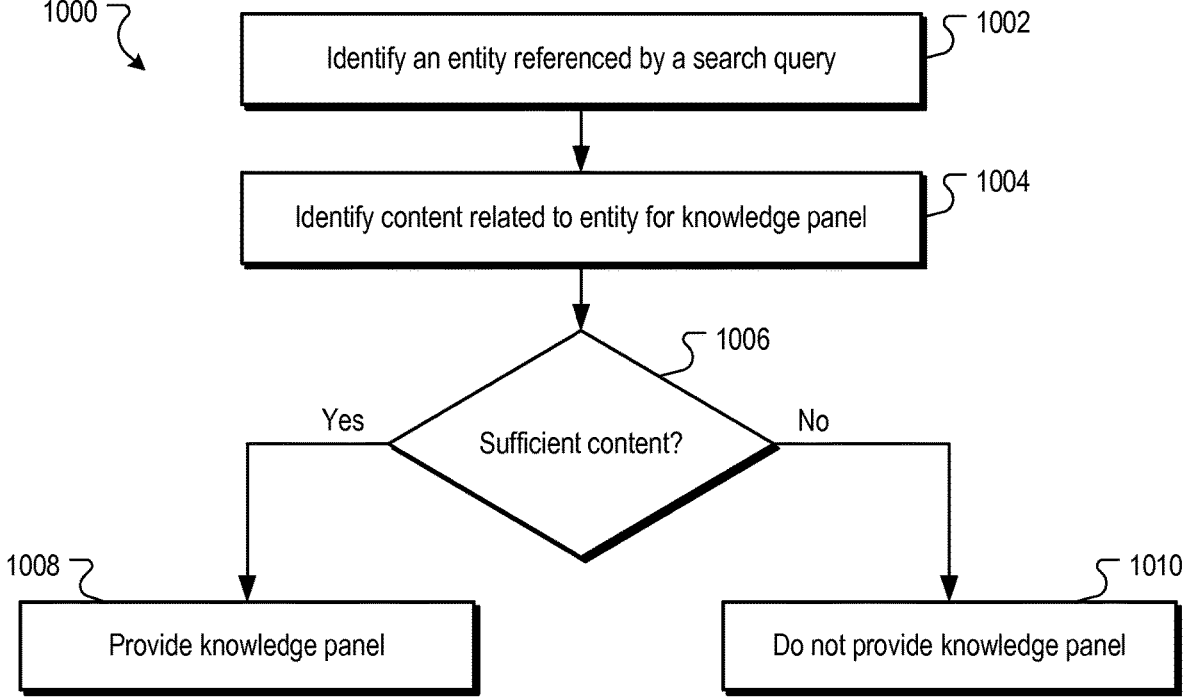

FIG. 10 is a flow chart of another example process for determining whether to provide a knowledge panel for a received search query.

Figure 11:
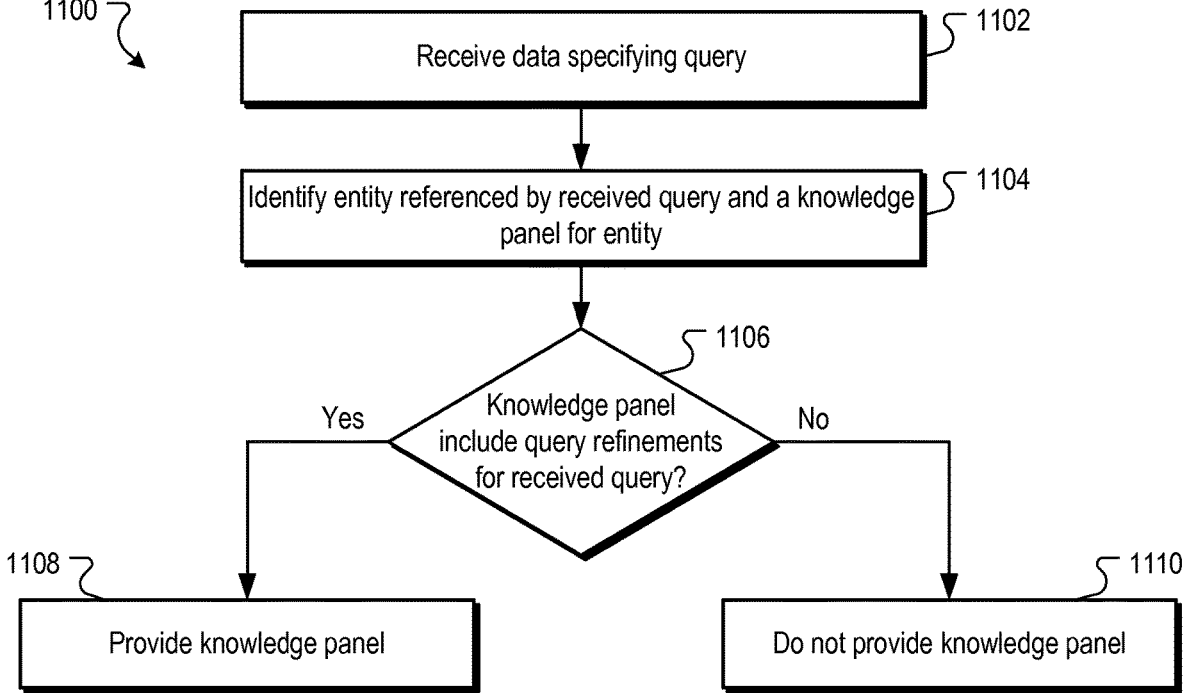

FIG. 11 is a flow chart of another example process for determining whether to provide a knowledge panel for a received search query.

Like reference numbers and designations in the various drawings indicate like elements.

DETAILED DESCRIPTION

A system can provide one or more knowledge panels in response to a received search query. A knowledge panel is a user interface element that provides a collection of information or other content related to a particular entity referenced by a search query. For example, the entity may be a person, place, country, landmark, animal, historical event, organization, business, sports team, sporting event, movie, song, album, game, work of art, or any other entity. In some implementations, the entity may be a concept, subject, or topic.

In general, a knowledge panel provides a summary of information for the entity. For example, a knowledge panel for a singer may include the name of the singer, an image of the singer, a description of the singer, one or more facts about the singer, content that identifies songs and albums recorded by the singer, and/or links to searches related to the singer. Other types of information and content can also be presented in the knowledge panel.

The knowledge panel for a particular entity typically includes content obtained from multiple disparate sources, e.g., multiple different domains. For example, a knowledge panel for a person may include an image obtained from an official web site for the person and facts obtained from an online encyclopedia that is not affiliated with the official web site for the person.

When a search query is received, the system can determine whether to provide a knowledge panel with search results for the search query. This determination may be based, in part, on whether the received query is determined to reference a known entity. In some implementations, the system determines whether the received query references a known entity based on a comparison of the received query, or terms of the received query, to an entity index that identifies known entities and their aliases. If a match is determined to exist based on the comparison, the received query is determined to reference the known entity, and the system may provide a knowledge panel for the matching entity.

Some queries may reference multiple entities or one or more terms that can be considered an alias of multiple entities. For example, the term "phoenix" may refer to a city in Arizona or a mythical bird. For queries that match, or are otherwise relevant to, multiple known entities, the system can determine whether to provide a knowledge panel for one of the matching entities, for example if one entity is the most likely entity for the query, or to provide a knowledge panel that includes content for multiple entities. For example, if a query includes "Phoenix, Arizona" or the query was received from a device located in Arizona, the system may determine that the city in Arizona is the most likely entity being referenced by the search query and provide a knowledge panel for the city of Phoenix. If the query includes only "phoenix" the system may provide a knowledge panel that includes content for the city of Phoenix and the mythical bird.

One example of a knowledge panel that includes content for multiple entities is a disambiguation knowledge panel. The disambiguation knowledge panel is a knowledge panel that includes content for two or more different known entities and/or user interface elements that enable the user to specify which of the known entities is of interest to the user. For example, the "phoenix" disambiguation knowledge panel could include content items including an artistic rendering of the mythical bird and a map representing Phoenix, Arizona Each of these content items can be linked to more information about the respective entities and/or include instructions that upon user interaction with one of the content items requests a knowledge panel for the entity represented by the content item.

Typically, a disambiguation knowledge panel includes the same or a similar amount of content for each entity referenced by the disambiguation knowledge panel. For example, a disambiguation knowledge panel may include, for each entity, a title for the entity, a brief description of the entity, and a link that, when selected, requests a resource having additional information or initiates a search for the entity. The area of the knowledge panel designated for each entity may also be the same or similar in size.

Another example of a knowledge panel that includes content for multiple entities is a dominant entity knowledge panel. A dominant entity knowledge panel includes content for multiple entities, but has a greater amount of content for one or more of the matching entities. For example, although multiple entities may match the search query, a particular entity may more closely match the search query, may be more topical to search results for the search query, or may be more relevant to the search query than the other entities. In such a case, the system may provide a dominant entity knowledge panel with more content for the particular query, and less content for each of the other matching entities. For example, a dominant entity knowledge panel may include a title, image, description, set of facts, links to resources related to the particular entity, and additional content for the particular entity. The same dominant entity knowledge panel may include, for each other matching entity, only a title, image, and link to additional content for the entity.

In some implementations, the system considers how well an entity matches the query and/or search results identified for the query to determine which of multiple matching entities for which to provide a knowledge panel. For example, the system may select an entity that closely matches the query and that is well represented by the search results for the query.

In some implementations, the system identifies a first set of entities that each matches the query. The system also identifies a second set of entities that are considered topical to the search results. The system may then select between entities that are included in both the first and second sets. This helps ensure that the selected entity for which to provide a knowledge panel both matches the search query and is also on topic for the query. Several operations for selecting between entities are described in detail below.

The system may also consider other factors when determining whether to provide a knowledge panel for a received query, such as click-through rates or other performance measures of search results for the received query and/or content available to include in a knowledge panel for an entity referenced by the received query. For example, the system may consider whether search results for the query have a low engagement rate, e.g., a low click-through rate, whether the query is non-navigational, e.g., the click-through rate of a high ranked search result for the query is high, whether there is sufficient content, for the entity referenced by the query, to be included in a knowledge panel, and/or whether the knowledge panel for the entity includes links to common search refinements that users would otherwise have to enter manually.

Figure 1:
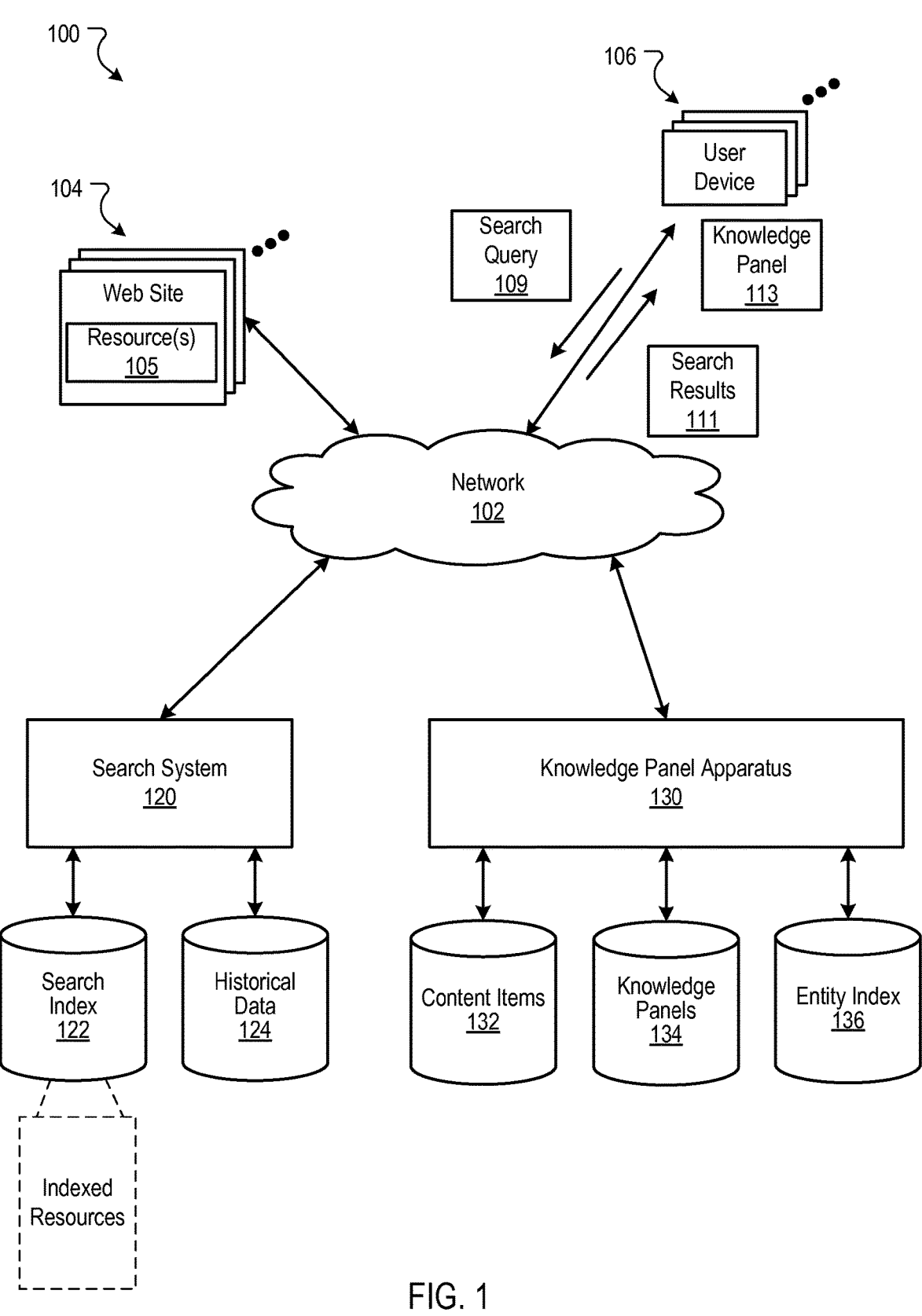
FIG. 1 is a block diagram of an example environment in which a search system provides search services.

FIG. 1 is a block diagram of an example environment 100 in which a search system 120 provides search services. The example environment 100 includes a network 102, e.g., a local area network (LAN), wide area network (WAN), the Internet, or a combination of them, connects web sites 104, user devices 106, and the search system 120. The network 102 can be accessed over a wired and/or a wireless communications link. For example, mobile computing devices, such as smartphones can utilize a cellular network to access the network. The environment 100 may include millions of web sites 104 and user devices 106.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is data provided over the network 102 and that is associated with a resource address, e.g., a uniform resource locator. Resources 105 that can be provided by a web site 104 include HTML pages, word processing documents, and portable document format (PDF) documents, images, video, and feed sources, to name just a few. The resources 105 can include content, e.g., words, phrases, images and sounds and may include embedded information, e.g., meta information and hyperlinks, and/or embedded instructions, e.g., scripts.

A user device 106 is an electronic device that is under control of a user and is capable of requesting and receiving resources 105 over the network 102. Example user devices 106 include personal computers, mobile computing devices, e.g., smartphones and/or tablet computing devices, that can send and receive data over the network 102. As used throughout this document the term mobile computing device ("mobile device") refers to a user device that is configured to communicate over a mobile communications network. A smartphone, i.e., a phone that is enabled to communicate over the Internet, is an example of a mobile device. A user device 106 typically includes a user application, e.g., a web browser, to facilitate the sending and receiving of data over the network 102.

To facilitate searching of resources 105, the search system 120 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 122.

The user devices 106 submit search queries 109 to the search system 120. In response, the search system 120 accesses the search index 122 to identify resources 105 that are relevant to, e.g., have at least a minimum specified relevance score for, the search query 109. The search system 120 identifies the resources 105, generates search results 111 that identify the resources 105, and returns the search results 111 to the user devices 106. A search result 111 is data generated by the search system 120 that identifies a resource 105 that is responsive to a particular search query, and includes a link to the resource 105. An example search result 111 can include a web page title, a snippet of text or a portion of an image extracted from the web page, and the URL of the web page.

Data for the search queries 109 submitted during user sessions are stored in a data store, such as the historical data store 124. For example, the search system 120 can store received search queries in the historical data store 124. Selection data specifying actions taken in response to search results 111 provided in response to each search query 109 are also stored in the historical data store 124, for example, by the search system 120. These actions can include whether a search result 111 was selected or otherwise interacted with at the user device. The selection data can also include, for each selection of a search result 111, data identifying the search query 109 for which the search result 111 was provided.

The selection data can be used to determine a click-through rate or other measure of performance of each search result 111 with respect to each search query 109. The click-through rate for a particular search result with respect to a particular search query can be determined by dividing the number of times the search result was selected from search results provided for the search query by the number of times the search result was presented with search results for the search query. The click-through rates can also be stored in the historical data store 124.

The example environment 100 also includes a knowledge panel apparatus 130 communicably coupled to the search system 120, e.g., directly coupled or coupled over a network such as network 102. The search system 120 can interact with the knowledge panel apparatus 130 to determine whether to provide a knowledge panel 113 for a search query 109. If it is determined that a knowledge panel 113 should be provided, the knowledge panel apparatus 130 can generate the knowledge panel 113 and provide the generated knowledge panel 113 to the search system 120. In turn, the search system 120 provides the knowledge panel 113, optionally with search results 111, to the user device 106 that submitted the search query 109. In some implementations, the knowledge panel apparatus 130 provides the knowledge panel 113 to the user device 106, bypassing the search system 120.

A knowledge panel 113 is typically provided for queries that have been determined to reference a particular factual entity, such as a person, place, country, landmark, animal, historical event, organization, business, sports team, sporting event, movie, song, album, game, work of art, or any other entity. In some implementations, a factual entity is a concept, subject, or topic.

In general, a knowledge panel 113 for a particular entity includes content that is obtained from multiple disparate resources and that is related to the particular entity. In some implementations, a knowledge panel 113 includes a set of factual information deemed relevant to the particular entity. For example, a knowledge panel 113 for an actor may include biographical information for the actor, as well as content associated with movies or television shows that the actor has appeared in. In some implementations, the knowledge panel 113 includes a summary of information related to the particular entity. For example, a knowledge panel 113 for a nation may include a map of the nation, the flag of the nation, the official language of the nation, and/or other facts and content related to the nation, and each of these discrete units of information may be obtained from a different resource than the other discrete units of information.

In some implementations, a knowledge panel 113 is much larger and consumes more area of a search interface than standard search results 111. For example, the knowledge panel 113 may span the length or height of three or more standard search results 111 to accommodate the content items in the knowledge panel 113 and to draw attention to the knowledge panel 113.

In some implementations, a knowledge panel 113 is displayed in a knowledge panel area. The knowledge panel area may be presented with or alongside a search results area that presents search results 111. In some implementations, the knowledge panel area consumes a larger area than the area consumed by two or more of the search results presented in the search results area.

The knowledge panel apparatus 130 includes or is communicably coupled to one or more data storage units that include a content item store 132, a knowledge panel store 134, and an entity index 136. The content item store 132 stores content items that can be inserted into a knowledge panel. In general, the content items are discrete units of content, e.g., data files, and can be in the form of text, images, videos, graphics, audio, tables, or other types of content.

The knowledge panel store 134 stores knowledge panels 113 for entities and/or knowledge panel templates that can be populated with content to generate a knowledge panel. In general, a knowledge panel template specifies types of content items to include in the knowledge panel 113 and includes placeholders for content items of the specified type. For example, a knowledge panel template may include placeholders for a title, one or more images, a description, a set of facts, and/or other types of content items.

The entity index 136 includes an index of known entities. For each entity, the entity index 136 can include data identifying aliases of the entity. For example, a famous celebrity may have several nicknames or stage names for which a user may enter as a query for the celebrity. Each of these nicknames or stage names can be included as aliases for the entity in the entity index 136.

The entity index 136 can also include an index of content items for each entity. In some implementations, the knowledge panel apparatus 130 identifies content items to include in knowledge panels 113 for each entity and stores the content items in the content item store 132. The knowledge panel apparatus 130 can also index the content items in the entity index 136 for use in subsequent retrieval of the content items.

Figure 2:
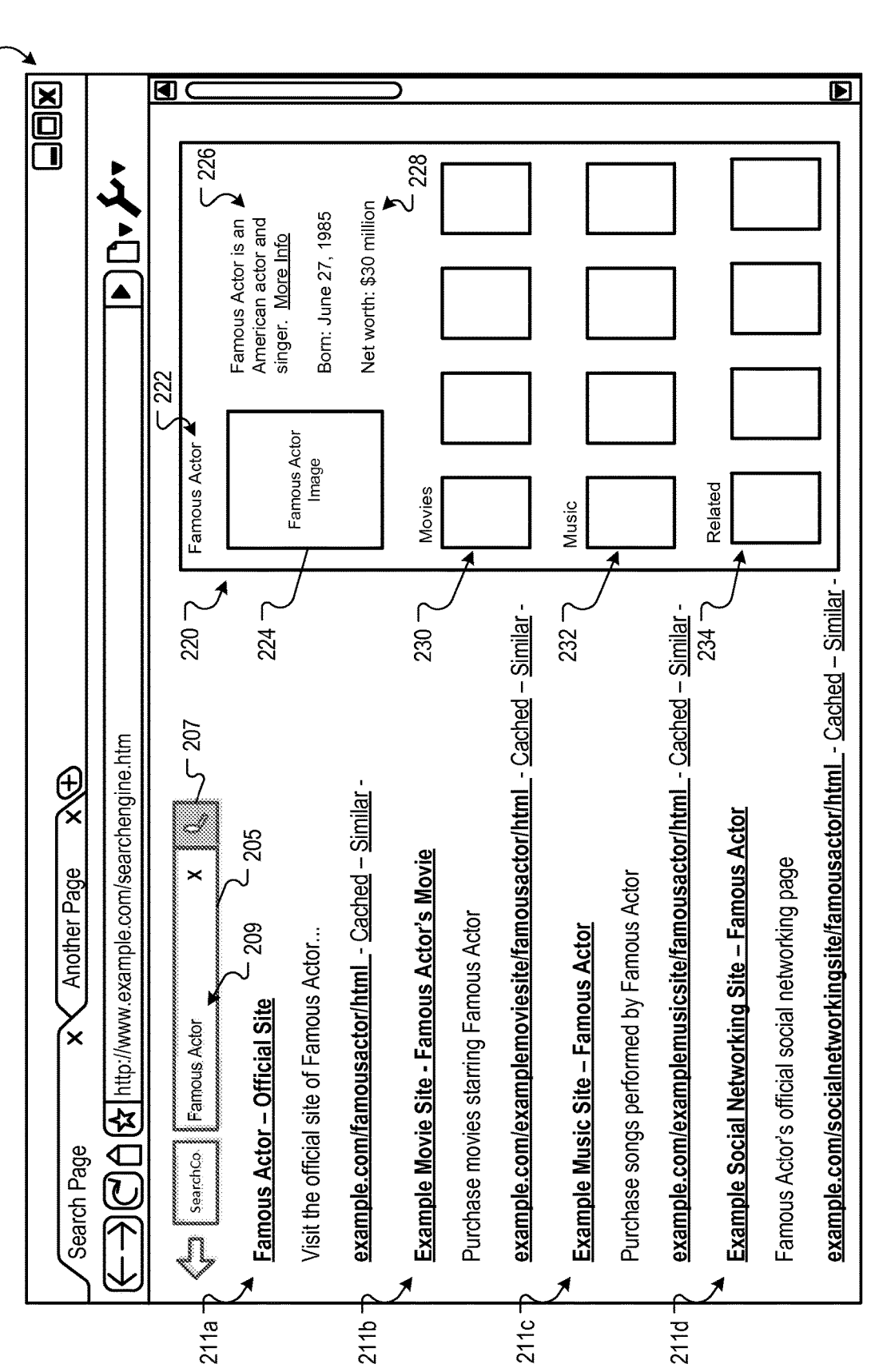
FIG. 2 is a screen shot of an example search interface in which a knowledge panel is presented with search results.

FIG. 2 is a screen shot of an example search interface 200 in which a knowledge panel 220 is presented with search results 211a-211d. The search interface 200 includes a query entry field 205 in which a user can enter a search query 209 and a search initiation element 207 with which a search query 209 can be submitted to the search system 120. The search interface 200 also includes search results 211a-211d and a knowledge panel 220. In this example search interface 200, the knowledge panel 220 and the search results 211a-211d have been received from the search system 120 and/or the knowledge panel apparatus 130 in response to the submission of the search query "Famous Actor."

The example knowledge panel 220 includes a title 222, an image of Famous Actor 224, a description of Famous Actor 226, and a set of facts about Famous Actor 228. This example set of facts 228 includes the date of birth of Famous Actor and the net worth of Famous Actor. Other facts could also be presented in a "person" template and can vary based on the person. For example, if the person is deceased, the date of death may be included in the set of facts.

In this example, Famous Actor is credited with movie appearances and music. To present information regarding the movie appearances and the music of Famous Actor, the knowledge panel 220 includes a set of images 230 of movie posters for movies in which Famous Actor appeared. The set of images 230 may be obtained, for example, from an online movie database and/or include a link to the online movie database. The knowledge panel also includes a set of images 232 for albums released by Famous Actor. The set of images 232 may be obtained, for example, from an online music database or an online music service and include a link to the source of the images 232. In some implementations, a table may be used to provide information about movies, albums, or songs related to Famous Actor. The knowledge panel 220 also includes a set of images 234 that includes images for related search queries. In some implementations, the images 230, 232, and 234 can each include a link that, when selected, initiates a search for the subject of the image.

Figure 3A:
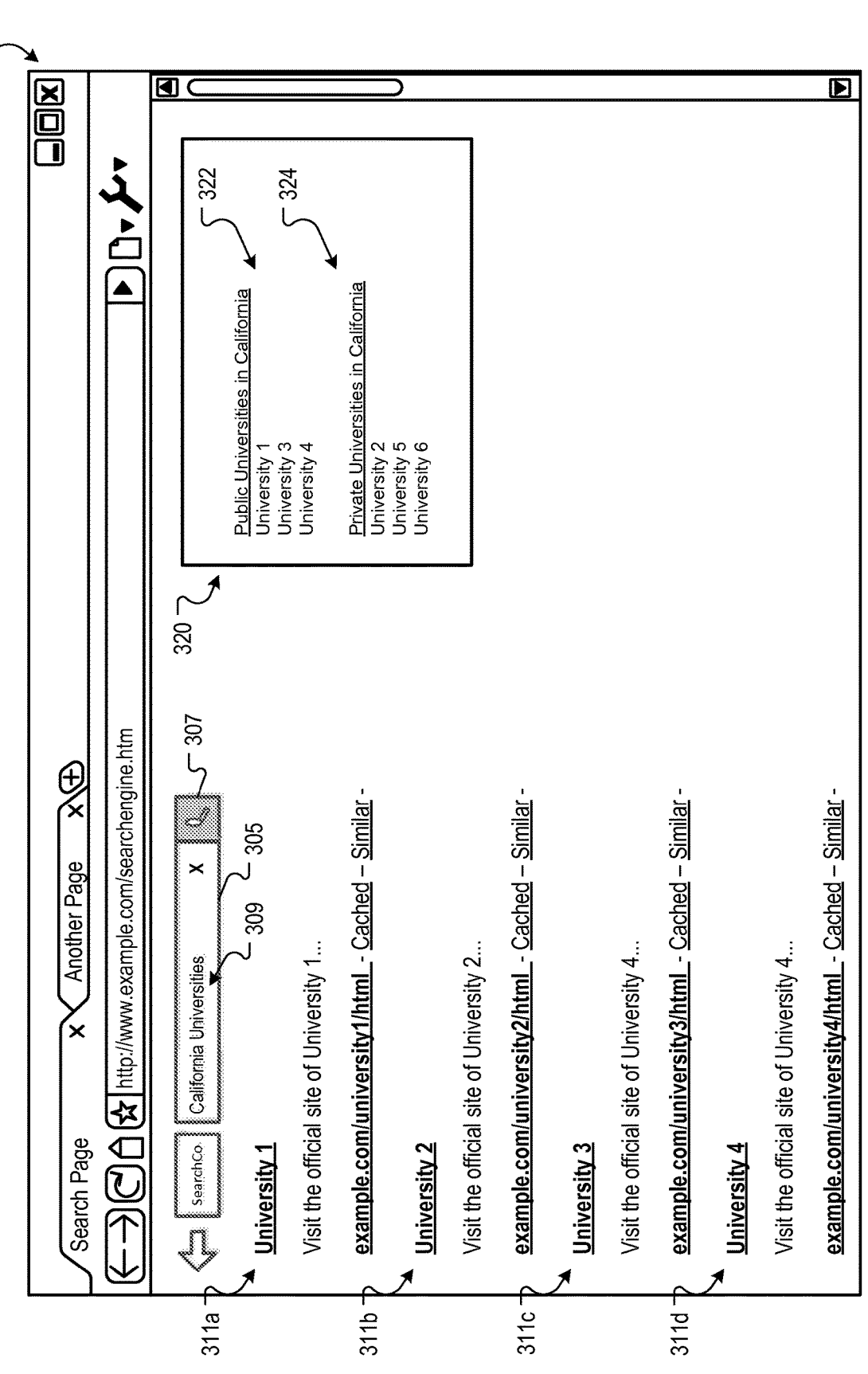
FIG. 3A is a screen shot of an example search interface in which a disambiguation knowledge panel is presented with search results.

FIG. 3A is a screen shot of an example search interface 300 in which a disambiguation knowledge panel 320 is presented with search results 311a-311d. As described above, a disambiguation knowledge panel can be provided for queries that reference multiple entities. For example, a disambiguation knowledge panel may be provided if the knowledge panel apparatus 130 determines that it is unclear which of the multiple entities the user is referencing with the received query. For example, the query "California University" can be considered to reference many universities and colleges in the state of California.

Similar to the search interface 200, the search interface 300 includes a query entry field 305 in which a user can enter a search query 309 and a search initiation element 307 with which a search query 309 can be submitted to the search system 120. The search interface 300 also includes search results 311a-311d and an example disambiguation knowledge panel 320. In this example search interface 300, the knowledge panel 320 and the search results 311a-311d have been received from the search system 120 in response to the submission of the search query "California University."

As there are many universities in California, it may be difficult to determine an appropriate university for which to provide a knowledge panel. Thus, the knowledge panel apparatus 130 may provide the disambiguation knowledge panel 320, which includes content about multiple universities in California. In particular, the knowledge panel 320 includes content for several public universities located in California 322 and content for several private universities located in California 324. The content for each university can include a link that, when selected, initiates a search for that university, or that links to the official web page or another resource for the university.

Figure 3B:
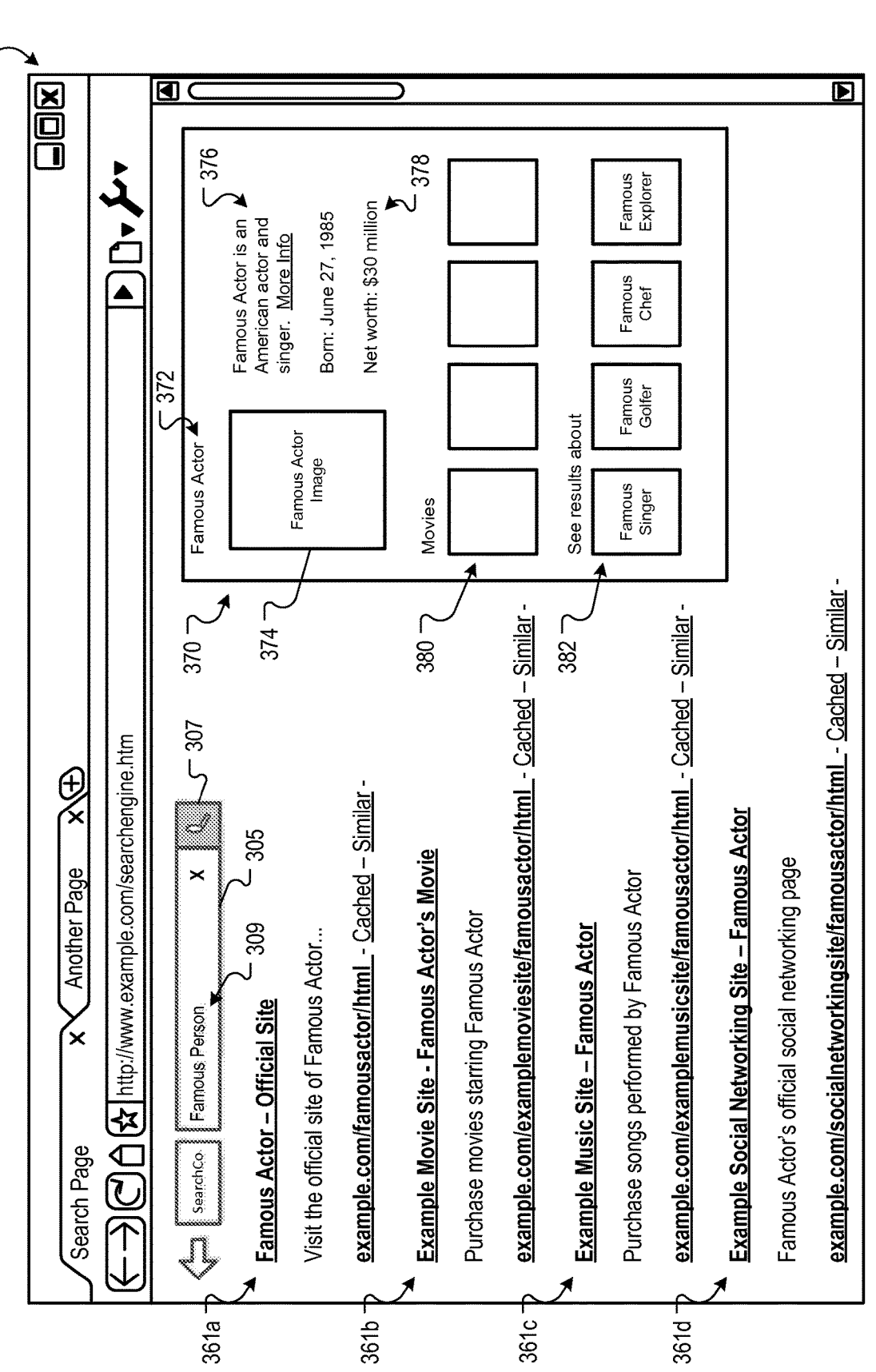
FIG. 3B is a screen shot of an example search interface in which a dominant entity knowledge panel is presented with search results.

FIG. 3B is a screen shot of an example search interface 350 in which a dominant entity knowledge panel 370 is presented with search results 361a-361d. As described above, a dominant entity knowledge panel may be provided when multiple entities match a search query, but a particular entity more closely matches, or is more topical to the search query than the other matching queries. The dominant entity knowledge panel may include more content for the particular entity than the other entities.

Similar to the search interface 300, the search interface 300 includes a query entry field 305 in which a user can enter a search query 309 and a search initiation element 307 with which a search query 309 can be submitted to the search system 120. The search interface 350 also includes search results 361a-361d and an example dominant entity knowledge panel 370. In this example search interface 350, the knowledge panel 370 and the search results 361a-361d have been received from the search system 120 in response to the submission of the search query "Famous Person."

In this example, the knowledge panel apparatus 130 has determined that the entities "Famous Actor," "Famous Singer," "Famous Golfer," "Famous Chef," and "Famous Explorer," each match the search query Famous Person. The knowledge panel apparatus 130 has also determined that the entity Famous Actor more closely matches, or is more topical, to the search query Famous Person than the other entities. Thus, the knowledge panel 370 includes more content for Famous Actor than for the other entities. In particular, the knowledge panel 370 includes a title for Famous Actor 372, an image of Famous Actor 374, a description of Famous Actor 376, a set of facts about Famous Actor 378, and a set of images 380 of movie posters for movies in which Famous Actor appeared. The knowledge panel 370 includes a set of images 382 for the other entities. The set of images 382 includes an image for each of the other entities. The image for an entity can include a link that initiates a search for the image's corresponding entity.

Figure 4:
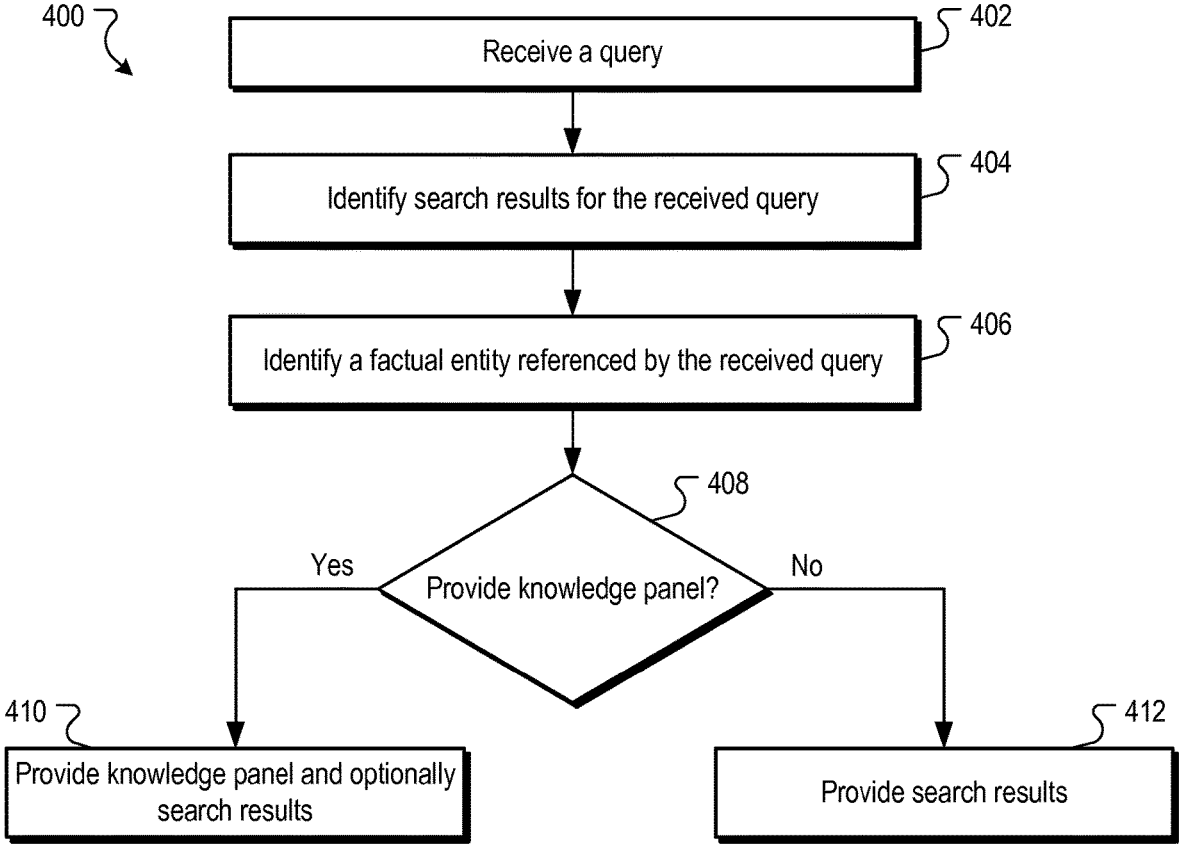
FIG. 4 is a flow chart of an example process for providing a knowledge panel and/or search results for a search query.

FIG. 4 is a flow chart of an example process 400 for providing a knowledge panel and/or search results for a search query. The process 400 can, for example, be implemented by the search system 120 and/or the knowledge panel apparatus 130. In some implementations, the operations of the example process 400 can be implemented as instructions stored on a non-transitory computer readable medium, where the instructions cause a data processing apparatus to perform operations of the example process 400.

Query data specifying a search query is received (402). For example, with reference to FIG. 1, the search system 120 may receive query data specifying a user query submitted from a user device 106. In response to receiving the query data, the search system 120 may identify search results 111 responsive to the search query 109 specified by the query data (404).

A factual entity referenced by the search query 109 is identified (406). In some implementations, the knowledge panel apparatus 130 identifies a factual entity referenced by a search query 109 by comparing one or more terms of the search query 109 to a list of known factual entities and/or aliases of the known factual entities. For example, if the search query is "Ima Singer," the knowledge panel apparatus 130 may determine whether "Ima Singer" is a factual entity by comparing "Ima" and/or "Singer" to a list of identifiers for known factual entities that are indexed in the entity index 136. If, based on the comparison, an identifier for a single factual entity is determined to match the search query 109, the single factual entity is identified as the factual entity being referenced by the search query 109.

If another entity, in addition to the single factual entity, has an alias of "Ima" or "Singer," then the knowledge panel apparatus 130 may also identify that entity as a factual entity referenced by the search query "Ima Singer." For example, the knowledge panel apparatus 130 may identify "Ima Dancer" as a factual entity referenced by the search query "Ima Singer." By way of another example, the knowledge panel apparatus 130 may identify the entities "Ima Singer" and "Ima Dancer" for a search query that includes the terms "videos of Ima," as both entities have an alias with the term "Ima" of the search query.

If multiple factual entities match or have an alias that matches the search query 109 or a portion of the search query 109, the knowledge panel apparatus 130 may select one of the matching entities as the identified factual entity or determine to provide a disambiguation knowledge panel, or a dominant entity knowledge panel, that includes content for multiple factual entities. In some implementations, the knowledge panel apparatus 130 considers a measure of topicality between each of the entities and one or more of the identified search results when selecting the entity. For example, the knowledge panel apparatus 130 may select the entity that is most topical to the identified search results or the entity that is topical to the highest ranked identified search result for the search query 109.

In general, the topicality between an entity and a search result 111, referred to herein as a partial topicality score, is determined based on the contents of the resource to which the search result is linked. In some implementations, the partial topicality score for an entity and a search result is based on a quantity, placement, and/or type of references to the entity that are included in the resource for the search result. The references can be in the form of text, e.g., text identifying the entity, images, e.g., an image having meta information identifying the entity, audio, video or other content that references the entity. As an example, a web page that includes multiple references to a particular landmark may have a higher topicality score for the landmark than a web page that includes a single reference to the landmark.

In some implementations, the partial topicality score for an entity and a search result is based on the location of the references to the entity in the resource for the search result. Different resource areas, e.g., title, main text, tags, and anchor text, may be given different weights in a relationship to determine the partial topicality score. For example, a reference to the entity included in the title of the resource may be assigned a greater weight than a reference to the entity included in the footnote of the resource. By way of another example, references that are located near a beginning of a resource, e.g., within a threshold quantity of words of an article or a threshold quantity of pixels of a top of a web page, may be assigned a higher weight than a reference located near an end of the resource, e.g., within a footnote or within a threshold quantity of words or pixels of a bottom of a web page. Processes for selecting a factual entity from multiple matching entities based on topicality are described in more detail below.

A determination is made whether to provide a knowledge panel for the identified entity (408). If a single entity is identified, or selected from multiple entities that match the search query, the knowledge panel apparatus 130 may determine to provide a knowledge panel 113 for the entity in response to identifying the entity.

The knowledge panel apparatus 130 may also consider additional criteria in determining whether to provide a knowledge panel 113 for the entity. In some implementations, the knowledge panel apparatus 130 considers criteria regarding content for the knowledge panel 113 and/or characteristics of the identified search results.

In some implementations, the knowledge panel apparatus 130 considers performance measures, e.g., click-through rates, for one or more of the identified search results with respect to the search query when determining whether to provide a knowledge panel 113 for the identified entity. For example, if the higher ranked search results for the received search query have low click-through rates, e.g., less than a threshold click-through rate or a lower click-through rate than a specified portion of all search queries, with respect to the received search query, this may indicate that the search results do not satisfy users' informational needs. In such cases, it may be beneficial to provide a knowledge panel 113 with content relevant to the identified entity or a knowledge panel that includes content for multiple entities referenced by the received search query and/or referenced by the identified search results. It may also be beneficial to provide a knowledge panel 113 that includes links to query revisions for the received search query, for example query revisions that are often received subsequent to the received query. Such a knowledge panel 113 may assist a user in locating the information for which the user is searching.

In some implementations, the knowledge panel apparatus 130 considers the click-through rate for a high ranked identified search result, e.g., top ranked search result, or one of the top ten search results, for determining whether to provide a knowledge panel in response to the received search query. If the click-through rate for a high ranked search result is relatively high, e.g., greater than a threshold or at least a threshold amount greater than each of the other search results, this may indicate that the resource to which the search result links satisfies the informational needs of the users that submit the search query. In such cases, it may not be advantageous to provide a knowledge panel 113 in response to the search query. If the click-through rate for the high ranked search result is not relatively high, e.g., less than a threshold or within a threshold amount of another search result, then the knowledge panel apparatus 130 may determine to provide a knowledge panel 113 for the identified entity in response to the search query.

In some implementations, the knowledge panel apparatus 130 considers the amount of content available to include in a knowledge panel for the entity when determining whether to provide a knowledge panel in response to a search query. For example, if the content item store 132 does not contain sufficient content to populate a knowledge panel 113 for the entity, e.g., fewer than a threshold number of content items, the knowledge panel apparatus 130 may determine that a knowledge panel 113 for the entity will not be provided in response to the search query.

In some implementations, the knowledge panel apparatus 130 bases the determination of whether to provide a knowledge panel, at least in part, on the type of content that is available for inclusion in a knowledge panel 113 for the entity. For example, the knowledge panel apparatus 130 may have knowledge panel templates that include placeholders for certain types of content to include in the knowledge panels. If a particular type of content specified by the knowledge panel template is not available for the entity, then the knowledge panel apparatus 130 may determine to not provide a knowledge panel 113 for the entity.

In some implementations, the knowledge panel apparatus 130 bases the determination of whether to provide a knowledge panel, at least in part, on the content of a knowledge panel 113 that has been generated for the entity. For example, the knowledge panel apparatus 130 determines whether the knowledge panel 113 for the entity includes links to refinements, e.g., common refinements, of the received search query. If the knowledge panel 113 includes refinements for the received search query, the knowledge panel apparatus 130 may determine to provide a knowledge panel 113 for the entity.

A combination of the aforementioned criteria can be used to determine whether to provide a knowledge panel 113. For example, the knowledge panel apparatus 130 may consider click-through rates for the identified search results with respect to the search query in combination with the amount of content available for the entity. Many other combinations are also possible. These criteria can also be used to determine the type of knowledge panel to provide, for example if the search query matches multiple entities.

If a determination is made to provide a knowledge panel 113, a knowledge panel 113 and optionally search results 111 are provided (410). For example, the knowledge panel apparatus 130 may identify a knowledge panel 113 for the identified entity, or entities, and provide the knowledge panel 113, e.g., data identifying a network location of the knowledge panel, to the search system 120. In turn, the search system 120 may provide the knowledge panel 113 to the user device 106 from which the search query was received. The search system 120 may also provide search results 111 for the received search query 109 to the user device 106. The user device 106 may present the knowledge panel 113 and the search results 111 in a search interface, such as the search interface 200 of FIG. 2 the search interface 300 of FIG. 3A, or the search interface 350 of FIG. 3B.

If a determination is made to not provide a knowledge panel 113, search results 111 are provided (412). For example, the knowledge panel apparatus 130 may provide to the search system 120 data indicating that a knowledge panel 113 should not be provided. In turn, the search system 120 can provide search results 111 without a knowledge panel 113 to the user device 106 from which the search query 109 was received.

FIG. 5 is a flow chart of an example process 500 for identifying a factual entity for providing a knowledge panel. The process 500 can, for example, be implemented by the knowledge panel apparatus 130. In some implementations, the operations of the example process 500 can be implemented as instructions stored on a non-transitory computer readable medium, where the instructions cause a data processing apparatus to perform operations of the example process 500.

Data specifying a search query 109 and search results 111 for the search query 109 are received (502). For example, the search system 120 may receive the search query 109 from a user device 106. In response to receiving the search query 109, the search system 120 may identify search results 111 for the search query 109 and provide data specifying the search query 109 and the search results 111 to the knowledge panel apparatus 130. This search query 109 and search results 111 may be provided to the knowledge panel apparatus 130 along with a request to provide a knowledge panel 113 or to determine whether a knowledge panel 113 is appropriate for the search query 109.

A first set of factual entities that match or have an alias that matches the search query 109 are identified (504). In some implementations, the knowledge panel apparatus 130 compares one or more terms of the search query 109 to a set of known entities, for example a set of known entities indexed in the entity index 136. The knowledge panel apparatus 130 can include, in the first set of factual entities, any known factual entity that matches or includes an alias that matches one or more terms of the search query 109.

A second set of factual entities that are topical to the search results are identified (506). In some implementations, the knowledge panel apparatus 130 identifies entities referenced by the search results 111 or a proper subset of the search results 111. For example, the knowledge panel apparatus 130 may identify each entity referenced by a certain number of the highest ranked search results for the search query 109. For each identified entity, the knowledge panel apparatus 130 determines a measure of topicality between the entity and one or more of the search results. For example, the knowledge panel apparatus 130 may determine an overall topicality score for each entity as described below with reference to FIG. 7. Using the overall topicality scores, the knowledge panel apparatus 130 can rank the identified entities and select entities for the second set based on the ranking. Example processes for selecting the second set of factual entities are illustrated in FIGS. 6 and 7 and described below.

A third set of factual entities is identified (508). The third set of factual entities can include factual entities that are included in both the first set and the second set. Thus, the third set can include factual entities that both match the search query 109 and are topical to the search results 111. The knowledge panel apparatus 130 can identify the third set by comparing the factual entities of the first set to the factual entities of the second and include the matching factual entities in the third set.

At least one of the factual entities of the third set is identified for reference in a knowledge panel (510). In some implementations, the knowledge panel apparatus 130 considers the measures of topicality between the entities in the third set and the search results 111 to identify an entity for a knowledge panel. For example, the knowledge panel apparatus 130 may consider the overall topicality score for each entity in the third set when identifying one or more entities to reference in the knowledge panel.

In addition, or in the alternative, the knowledge panel apparatus 130 may consider click-through rates of search results that reference each entity. For example, the knowledge panel apparatus 130 may interact with the search system 120 to identify a click-through rate for search results identified for the search query 109. The click-through rate for each search result is measured with respect to the search query 109. The search results may be limited to a particular number, e.g., 10, of the highest ranked search results. The knowledge panel apparatus 130 may determine an overall click-through rate for each entity based on the click-through rate of each search result that references the entity. For example, if two search results reference the entity, or the resource referenced by the search results reference the entity, the click-through rates for those two search results can be used to determine an overall click-through rate for the entity.

In some implementations, the knowledge panel apparatus 130 determines an entity score for each entity of the third set. The entity score for can entity may be based on the overall topicality score for the entity and/or the overall click-through rate for the entity. For example, the entity score for an entity may be the sum or average of the overall topicality score and the overall click-through rate for the entity.

The knowledge panel apparatus 130 can select one or more of the entities for reference in the knowledge panel based on the entity scores. For example, the knowledge panel apparatus 130 may select the entity having the highest entity score. However, in some cases, two or more distinct entities may have similar entity scores. Thus, it may be beneficial to consider a difference in the entity scores between the entity having the highest entity score and one or more entities having a lower entity score, e.g., second and or third highest scores. If there is a substantial difference between the highest entity score and the second highest entity score, e.g., the difference is greater than a first threshold, the knowledge panel apparatus 130 may select only the entity having the highest entity score for reference in the knowledge panel.

If the difference between the highest entity score and the second highest entity score is small, e.g., the difference is less than a second threshold, the knowledge panel apparatus 130 may determine to provide a disambiguation knowledge panel that references the entity having the highest entity score and the entity having the second highest entity score. The knowledge panel apparatus 130 can also reference additional entities in the disambiguation knowledge panel.

For example, if the difference between the highest entity score and the third highest entity score is less than the second threshold, the knowledge panel apparatus 130 may reference the entity having the third highest entity score in the knowledge panel.

If the difference between the highest entity score and the second highest entity score is between the first threshold and the second threshold, the knowledge panel apparatus 130 may determine to provide a dominant entity knowledge panel that includes content for the entity having the highest entity score and content for the entity having the second highest entity score. The knowledge panel may include more content for the entity having the highest entity score than the entity having the second highest entity score. Additional entities may also be referenced by the dominant entity knowledge panel if the difference between the highest entity score and the entity score for the additional entity is within the first and second thresholds.

In some implementations, rather than consider the difference between entity scores to determine whether to select multiple entities, and therefore to select the type of knowledge panel, the knowledge panel apparatus 130 may consider the ratio between the entity scores. For example, if the ratio between the highest entity score and the second highest entity score exceeds a first threshold, the knowledge panel apparatus 130 may determine to provide a knowledge panel for the entity having the highest entity score. If the ratio is less than a second threshold, the knowledge panel apparatus 130 may determine to provide a disambiguation knowledge panel for the entity having the highest entity score and one or more additional entities. If the ratio is between the first and second thresholds, the knowledge panel apparatus 130 may determine to provide a dominant entity knowledge panel for the entity having the highest entity score and one or more additional entities.

FIG. 6 is a flow chart of an example process 600 for identifying a subset of factual entities for a received search query. The process 600 can, for example, be implemented by the knowledge panel apparatus 130. In some implementations, the operations of the example process 600 can be implemented as instructions stored on a non-transitory computer readable medium, where the instructions cause a data processing apparatus to perform operations of the example process 600.

Data specifying a search query 109 and search results 111 for the search query 109 are received (602). For example, the knowledge panel apparatus 130 may receive the data from the search system 120 in a manner similar to that described above with reference to FIG. 5.

A set of factual entities referenced by the search results 111 is identified (604). In some implementations, the knowledge panel apparatus 130 compares terms found on the resources to which the search results 111 link to a list of known entities and their aliases. Each known entity that matches one or more of the terms may be included in the set of factual entities.

A proper subset of the higher ranked search results 111 is identified (606). In some implementations, the knowledge panel apparatus 130 identifies a particular number of the higher ranked search results 111. For example, the knowledge panel apparatus 130 may be configured to identify, based on the relative placements among the search results, the top 10, top 20, or top 50 search results. In some implementations, the knowledge panel apparatus 130 may receive rank or relevance scores for each search result 111 with respect to the search query 109 and use this information to identify the proper subset of search results. For example, the knowledge panel apparatus 130 may identify for the proper subset the search results 111 that have a rank or relevance score that satisfies a particular threshold score. A rank or relevance score may satisfy the threshold score by meeting or exceeding the threshold score.

For each factual entity of the set of factual entities, a partial topicality score is identified for the entity with respect to each search result of the proper subset (608). Each partial topicality score is a measure of topical relatedness between the respective factual entity and the resource to which the respective search result 111 links. For example, an official web page or online encyclopedia web page for a particular celebrity may have a higher topicality score for the celebrity than a web page that includes content about many different celebrities.

In some implementations, the knowledge panel apparatus 130 determines the partial topicality scores based on the content of the resources to which the search results link and the factual entities, as described above. In some implementations, the knowledge panel apparatus 130 obtains the partial topicality score from another source, such as a topicality index or a topicality score apparatus.

A proper subset of the factual entities is selected based on the partial topicality scores (610). In some implementations, the knowledge panel apparatus 130 ranks the factual entities based on the partial topicality scores and selects a certain number of the higher ranked factual entities or those having a partial topicality score that satisfies a threshold topicality score for the proper subset. For example, a partial topicality score may satisfy the threshold topicality score by meeting or exceeding the threshold topicality score.

In some implementations, the knowledge panel apparatus 130 determines an overall topicality score for each factual entity using the partial topicality scores for the factual entity and selects the entities for the proper subset based on the overall topicality scores. FIG. 7 is a flow chart of an example process 700 for selecting a subset of factual entities based on overall topicality scores. The process 700 can, for example, be implemented by the knowledge panel apparatus 130. In some implementations, the operations of the example process 700 can be implemented as instructions stored on a non-transitory computer readable medium, where the instructions cause a data processing apparatus to perform operations of the example process 700.

An overall topicality score is determined for each factual entity of a set of factual entities based on partial topicality scores for the factual entity (702). In some implementations, the knowledge panel apparatus 130 determines the overall topicality score for a particular factual entity by computing a sum or weighted sum of the partial topicality scores for the particular factual entity. In some implementations, the knowledge panel apparatus 130 considers only the partial topicality scores for a particular number of the higher ranked search results when determining the overall topicality scores. For example, the knowledge panel apparatus 130 may determine the overall topicality score for a factual entity by determining the sum of the partial topicality scores for the factual entity with respect to the top "n" search results, where "n" is a non-zero number.

A proper subset of the factual entities is selected based on the overall topicality scores (704). In some implementations, the knowledge panel apparatus 130 selects a certain number of the factual entities having the higher overall topicality scores. In some implementations, the knowledge panel apparatus 130 selects each factual entity that has a topicality score that satisfies a threshold topicality score.

FIG. 8 is a flow chart of an example process 800 for identifying a factual entity for providing a knowledge panel. The process 800 can, for example, be implemented by the knowledge panel apparatus 130. In some implementations, the operations of the example process 800 can be implemented as instructions stored on a non-transitory computer readable medium, where the instructions cause a data processing apparatus to perform operations of the example process 800.

Data specifying a search query 109 and search results 111 for the search query 109 are received (802). For example, the knowledge panel apparatus 130 may receive the data from the search system 120 as described above with reference to FIG. 5.

A set of factual entities that match or have an alias that matches the search query 109 are identified (804). In some implementations, the knowledge panel apparatus 130 compares one or more terms of the search query 109 to a set of known entities, for example a set of known entities indexed in the entity index 136. The knowledge panel apparatus 130 can include any known factual entity that matches or includes an alias that matches one or more terms of the search query 109 in the set of factual entities.

A partial topicality score is determined for each search result 111 with respect to each factual entity of the set of factual entities (806). These partial topicality scores can be the same or substantially similar to the partial topicality scores described above with respect to FIG. 6. In general, the partial topicality score for a particular search result with respect to a particular factual entity is a measure of topical relatedness between the particular search result and the particular factual entity.

A proper subset of the partial topicality scores that satisfy a threshold topicality score is identified (808). For example, the knowledge panel apparatus 130 may compare each partial topicality score to the threshold topicality score to identify the partial topicality scores that exceed the threshold topicality score.

A determination is made as to which of the proper subset of partial topicality scores corresponds to the highest ranking search results 111 for the search query 109 (810). Each partial topicality score corresponds to a particular search result and a particular factual entity. The knowledge panel apparatus 130 can identify the search result to which each topicality score included in the proper subset corresponds and determine which of the identified search results is the highest ranked with respect to the other search results to which the topicality scores of the proper subset correspond. This search result may or may not be the highest ranked search result overall as the partial topicality scores for that search result may not have satisfied the threshold topicality score.

The factual entity that corresponds to the partial topicality score determined to correspond to the highest ranking search result is selected as the factual entity to reference in a knowledge panel 113. This example process 800 helps increase the likelihood that the factual entity chosen for the knowledge panel 113 matches the highest ranked search result that has a clear topic. As the knowledge panels 113 are often displayed alongside the top results, this approach offers a more visually consistent experience for users.

Figure 9:
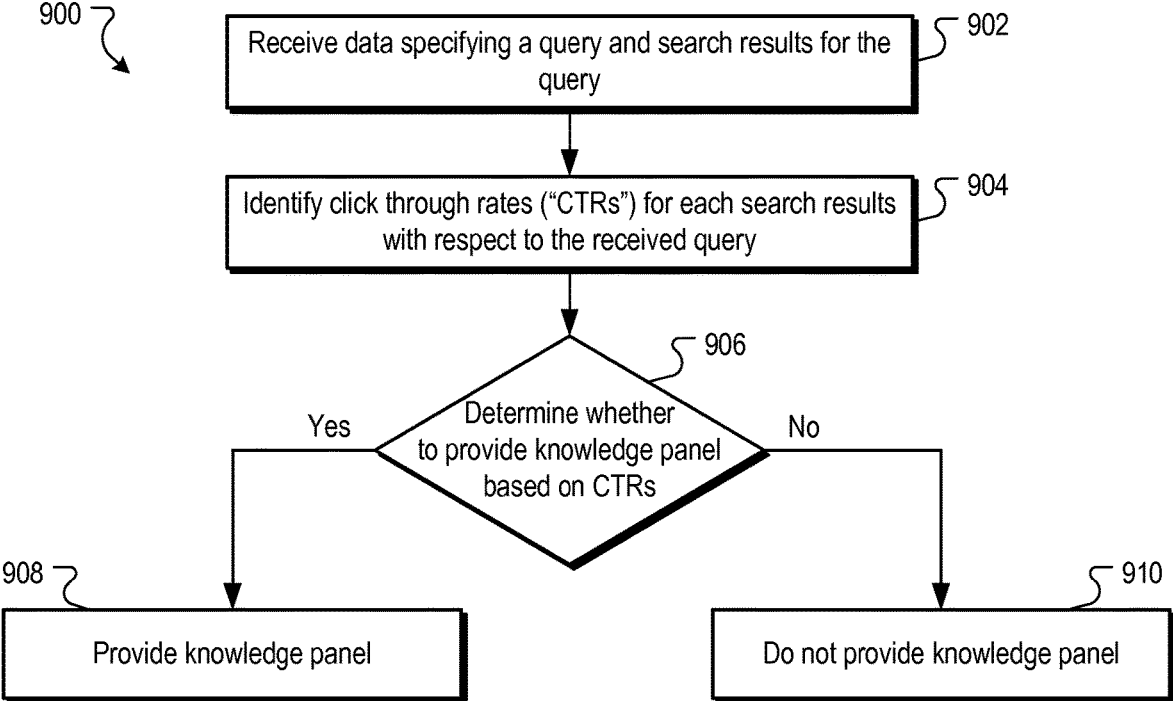
FIG. 9 is a flow chart of an example process for determining whether to provide a knowledge panel for a received search query.

FIG. 9 is a flow chart of an example process 900 for determining whether to provide a knowledge panel for a received search query. The process 900 can, for example, be implemented by the knowledge panel apparatus 130. In some implementations, the operations of the example process 900 can be implemented as instructions stored on a non-transitory computer readable medium, where the instructions cause a data processing apparatus to perform operations of the example process 900.

Data specifying a search query 109 and search results 111 for the search query 109 are received (902). For example, the knowledge panel apparatus 130 may receive the data from the search system 120 as described above with reference to FIG. 5.

A click-through rate is identified for each search result 111 with respect to the search query 109. For example, the search system 120 may provide the click-through rates to the knowledge panel apparatus 130 along with the data specifying the search query 109 and the search results 111.

A determination is made whether to provide a knowledge panel 113 in response to the received search query 109 based on one or more of the identified click-through rates (906). In some implementations, the knowledge panel apparatus 130 evaluates the click-through rates of at least a subset of the search results 111, e.g., a particular number of the highest ranked search results, to determine whether the click-through rates indicate that the search results 111 have low engagement for the search query 109. For example, if the click-through rates for the search results 111 are low, e.g., less than a threshold click-through rate, this may indicate that the search results 111 do not satisfy the users' informational needs. In such cases, the knowledge panel apparatus 130 may determine to provide a knowledge panel 113 with content relevant to the identified entity, a disambiguation knowledge panel that includes content for multiple entities referenced by the received search query, or a knowledge panel 113 that includes links to query revisions for the received search query.

In some implementations, the click-through rate for one or more high ranked search results for the search query 109 are evaluated to determine whether to provide a knowledge panel 113 in response to the search query 109. For example, if the click-through rate for the highest ranked search result is high, e.g., greater than a threshold or at least a threshold amount greater than each of the other search results, this may indicate that the resource to which the search result links satisfies the informational needs of the users that submit the search query. In such cases, it may not be advantageous to provide a knowledge panel 113 in response to the search query since the user's informational need may be satisfied by visiting a single site.

If the knowledge panel apparatus 130 determines to provide a knowledge panel 113, the knowledge panel apparatus 130 can provide a knowledge panel 113 to the search system 120 or the user device 106 from which the search query 109 was received (908). If the knowledge panel apparatus 130 determines to not provide a knowledge panel 113, the knowledge panel 113 apparatus 130 can send data to the search system 120 indicating that a knowledge panel 113 should not be provided for the search query 109.

FIG. 10 is a flow chart of another example process 1000 for determining whether to provide a knowledge panel for a received search query. The process 1000 can, for example, be implemented by the knowledge panel apparatus 130. In some implementations, the operations of the example process 1000 can be implemented as instructions stored on a non-transitory computer readable medium, where the instructions cause a data processing apparatus to perform operations of the example process 1000.

An entity referenced by a search query 109 is identified (1002). For example, the knowledge panel apparatus 130 may identify the entity as described above. Content related to the entity is identified (1004). In some implementations, the knowledge panel apparatus 130 accesses the content items store 132 to obtain content items for the entity. In some implementations, the knowledge panel apparatus 130 obtains a knowledge panel template for the entity.

A determination is made whether there is sufficient content to provide in a knowledge panel 113 for the entity (1006). In some implementations, a knowledge panel template includes placeholders for particular types of content to include in the knowledge panel. For example, a knowledge panel template may include a placeholder for a canonical image and a set of facts regarding an entity. The knowledge panel apparatus 130 can compare the type of content required by the knowledge panel template to the content available for the entity to determine whether there is content available for each content type, for at least one particular type of content, or for at least a minimum number of content types. For example, if the knowledge panel template includes a placeholder for a canonical image, but the knowledge panel apparatus 130 does not have access to a canonical image for the entity, e.g., a particular type of content, the knowledge panel apparatus 130 may determine that there is not sufficient content to provide in a knowledge panel 113.

If the knowledge panel apparatus 130 determines that there is sufficient content to provide in a knowledge panel 113 for the entity, the knowledge panel apparatus 113 determines to provide a knowledge panel 113 for the entity (1008). If the knowledge panel apparatus 130 determines that there is not sufficient content to provide in a knowledge panel 113 for the entity, the knowledge panel apparatus 113 determines to not provide a knowledge panel 113 for the entity (1010). The knowledge panel apparatus 130 may also send data to the search system 120 indicating that a knowledge panel 113 should not be provided for the search query 109.

FIG. 11 is a flow chart of another example process 1100 for determining whether to provide a knowledge panel for a received search query. The process 1100 can, for example, be implemented by the knowledge panel apparatus 130. In some implementations, the operations of the example process 1100 can be implemented as instructions stored on a non-transitory computer readable medium, where the instructions cause a data processing apparatus to perform operations of the example process 1100.

Data specifying a search query 109 are received (1102). For example, the knowledge panel apparatus 130 may receive the data from the search system 120 as described above with reference to FIG. 5.

An entity referenced by the search query 109 and a knowledge panel for the entity are identified (1104). For example, the knowledge panel apparatus 130 may identify the entity referenced by the search query 109, as described above. After identifying the entity, the knowledge panel apparatus 130 can, for example, access the knowledge panels store 134 to identify a knowledge panel 113 for the identified entity.

A determination is made whether the knowledge panel for the identified entity includes links to common search refinements for the received search query 109 (1106). In some implementations, the knowledge panel apparatus 130 determines whether the knowledge panel includes links to other resources. If so, the knowledge panel apparatus 130 can compare the resources to which the links are directed to a set of common query refinements for the search query 109. If there is at least one match, then the knowledge panel apparatus 130 may determine that the knowledge panel for the identified entity includes links to common search refinements for the received search query 109.

If the knowledge panel apparatus 130 determines that the knowledge panel for the identified entity includes links to common search refinements for the received search query 109, the knowledge panel apparatus 130 determines to provide a knowledge panel for the entity (1108). If the knowledge panel apparatus 130 determines that the knowledge panel for the identified entity does not include links to common search refinements for the received search query 109, the knowledge panel apparatus 130 determines to not provide a knowledge panel for the entity (1110).

Although FIGS. 9-11 are illustrated and described as separate processes, the knowledge panel apparatus 130 can consider the criteria of each process in determining whether to provide a knowledge panel 113 for a received search query 109. For example, if the click-through rates for the search results indicate that a knowledge panel 113 should be provided, but there is not sufficient content available for the identified entity, then the knowledge panel apparatus 130 may elect to not provide a knowledge panel.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
receiving a query from a client device;
obtaining search results that are responsive to the query;
identifying, using an entity index, at least two entities responsive to the query;
determining, for each entity of the at least two entities, a respective topicality score that measures topical relatedness between the entity and content represented by a proper subset of the search results;
determining a difference between the respective topicality score of a first entity of the at least two entities and the respective topicality score of a second entity of the at least two entities, wherein the respective topicality score of the first entity represents a highest respective topicality score;
in response to determining that the difference is within a first threshold:
generating a disambiguation knowledge panel, the disambiguation knowledge panel including an image for the first entity, a title for the first entity, and a description for the first entity, an image for the second entity, a title for the second entity, and a description for the second entity, and
providing at least the proper subset of the search results and the disambiguation knowledge panel in a response to the query; and
in response to determining that the difference is not within the first threshold but is within a second threshold:
generating a dominant entity knowledge panel with information for the second entity, the dominant entity knowledge panel including for the first entity at least one image, the title for the first entity, a set of facts relating to the first entity, and links to resources related to the first entity and the image for the second entity, the title for the second entity, and the description for the second entity, and
providing at least the proper subset of the search results and the dominant entity knowledge panel in a response to the query.

2. The system of claim 1, the disambiguation knowledge panel further including a first link for the first entity and a second link for the second entity, the first link configured to initiate a search for the first entity and the second link configured to initiate a search for the second entity.

3. The system of claim 1, the disambiguation knowledge panel further including a first link for the first entity and a second link for the second entity, the first link configured to request a resource having additional information for the first entity and the second link configured to request a resource having additional information for the second entity.

4. The system of claim 1, wherein the difference is a first difference and the operations further comprise:

determining a second difference between a respective topicality score for a third entity and the respective topicality score for the first entity;
determining that the second difference is within the first threshold; and
including an image for the third entity; a title for the third entity; and a description of the third entity in the disambiguation knowledge panel.

5. The system of claim 1, the operations further comprising:
in response to determining that the difference is not within the first threshold and is not within the second threshold:
generating the dominant entity knowledge panel for the first entity without the information for the second entity.

6. The system of claim 1, wherein the query is a one or two word query.

7. The system of claim 1, wherein an area including the image, the title, and the description for the first entity is a same visual size in the disambiguation knowledge panel as an area including the image, the title, and the description for the second entity.

8. A non-transitory computer storage medium encoded with a computer program, the computer program comprising instructions that when executed by data processing apparatus cause the data processing apparatus to perform operations comprising:
receiving a query from a client device;
obtaining search results that are responsive to the query;
identifying, using an entity index, at least two entities responsive to the query;
determining, for each entity of the at least two entities, a respective topicality score that measures topical relatedness between the entity and content represented by a proper subset of the search results;
determining a difference between the respective topicality score of a first entity of the at least two entities and the respective topicality score of a second entity of the at least two entities, wherein the respective topicality score of the first entity represents a highest respective topicality score;
in response to determining that the difference is within a first threshold:
generating a disambiguation knowledge panel, the disambiguation knowledge panel including an image for the first entity, a title for the first entity, and a description for the first entity, an image for the second entity, a title for the second entity, and a description for the second entity, and
providing at least the proper subset of the search results and the disambiguation knowledge panel in a response to the query; and
in response to determining that the difference is not within the first threshold but is within a second threshold:
generating a dominant entity knowledge panel with information for the second entity, the dominant entity knowledge panel including for the first entity at least one image, the title for the first entity, a set of facts relating to the first entity, and links to resources related to the first entity and the image for the second entity, the title for the second entity, and the description for the second entity, and
providing at least the proper subset of the search results and the dominant entity knowledge panel in a response to the query.

9. The non-transitory computer storage medium of claim 8, the disambiguation knowledge panel further including a first link for the first entity and a second link for the second entity, the first link configured to initiate a search for the first entity and the second link configured to initiate a search for the second entity.

10. The non-transitory computer storage medium of claim 8, the disambiguation knowledge panel further including a first link for the first entity and a second link for the second entity, the first link configured to request a resource having additional information for the first entity and the second link configured to request a resource having additional information for the second entity.

11. The non-transitory computer storage medium of claim 8, wherein the difference is a first difference and the operations further comprise:

determining a second difference between a respective topicality score for a third entity and the respective topicality score for the first entity;

determining that the second difference is within the first threshold; and including an image for the third entity; a title for the third entity; and a description of the third entity in the disambiguation knowledge panel.

12. The non-transitory computer storage medium of claim 8, the operations further comprising:

in response to determining that the difference is not within the first threshold and is not within the second threshold:

generating the dominant entity knowledge panel without the information for the second entity.

13. The non-transitory computer storage medium of claim 8, wherein the query is a one or two word query.

14. The non-transitory computer storage medium of claim 8, wherein an area including the image, the title, and the description for the first entity is a same visual size in the disambiguation knowledge panel as an area including the image, the title, and the description for the second entity.

* * * * *